(12) United States Patent
Victor

(10) Patent No.: US 7,639,148 B2
(45) Date of Patent: *Dec. 29, 2009

(54) METHOD AND ARRANGEMENT FOR CONTROLLING VEHICULAR SUBSYSTEMS BASED ON INTERPRETED DRIVER ACTIVITY

(75) Inventor: Trent Victor, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,786

(22) Filed: Jun. 7, 2004

(65) Prior Publication Data

US 2005/0030184 A1  Feb. 10, 2005

Related U.S. Application Data

(60) Provisional application No. 60/320,253, filed on Jun. 6, 2003.

(51) Int. Cl.
*G08B 23/00* (2006.01)
(52) U.S. Cl. .................. 340/576; 340/439; 340/575
(58) Field of Classification Search ............. 340/576, 340/575, 439; 180/272; 701/93, 97, 98
See application file for complete search history.

(56) References Cited

U.S. PATENT DOCUMENTS

| | | |
|---|---|---|
| 4,234,051 A | 11/1980 | Morris, Jr. |
| 5,585,758 A | 12/1996 | Prines et al. |
| 5,786,765 A | 7/1998 | Kumakura et al. |
| 5,900,819 A | 5/1999 | Kyrtsos |
| 5,942,979 A | 8/1999 | Luppino |
| 6,060,989 A | 5/2000 | Gehlot |
| 6,130,617 A | 10/2000 | Yeo |
| 6,424,265 B2 * | 7/2002 | Farley et al. ............... 340/576 |
| 6,496,117 B2 | 12/2002 | Gutta et al. |
| 6,599,243 B2 | 7/2003 | Woltermann et al. |
| 6,731,925 B2 * | 5/2004 | Naboulsi ................... 455/345 |
| 6,950,027 B2 * | 9/2005 | Banas ........................ 340/576 |

(Continued)

FOREIGN PATENT DOCUMENTS

DE  19715519  11/1997

(Continued)

OTHER PUBLICATIONS

Partial European Search Report for application No. EP 07 02 3142, completed Mar. 14, 2008.

(Continued)

*Primary Examiner*—Brent Swarthout
(74) *Attorney, Agent, or Firm*—Novak Druce + Quigg LLP

(57) ABSTRACT

Method and arrangement for controlling a subsystem of a vehicle dependent upon a sensed level of driver inattentiveness to vehicle driving tasks. A variable characteristic is measured, on a substantially real-time basis, which correlates to the driver's inattentiveness. The level of inattentiveness is assessed based at least in part on the measurement. The performance of a subsystem of the vehicle, such as cruise control or lane keeping support, is tailored, based thereupon, to assure that behavior of the vehicle appropriately matches the driver's present level of inattentiveness. The subsystem's operation is controlled in an effort to avoid or prevent the establishment of driving conditions that become inherently more dangerous as the driver's level of inattentiveness increases.

58 Claims, 10 Drawing Sheets

U.S. PATENT DOCUMENTS

| | | | |
|---|---|---|---|
| 6,974,414 B2 * | 12/2005 | Victor | 600/300 |
| 6,998,972 B2 * | 2/2006 | Geisler et al. | 340/439 |
| 7,072,764 B2 * | 7/2006 | Donath et al. | 701/200 |
| 2002/0116156 A1 * | 8/2002 | Remboski et al. | 702/188 |
| 2003/0095046 A1 * | 5/2003 | Borugian | 340/576 |
| 2003/0097218 A1 * | 5/2003 | Borugian | 701/213 |

FOREIGN PATENT DOCUMENTS

| | | | |
|---|---|---|---|
| FR | 2728837 | * | 7/1996 |
| JP | H10166895 | | 6/1998 |
| JP | 20022325 | | 1/2002 |
| JP | 2003118423 | | 4/2003 |
| WO | 9849028 | | 11/1998 |
| WO | 02096694 | | 12/2002 |

OTHER PUBLICATIONS

International Search Report for International Patent Application PCT/SE2004/000895, completed Sep. 8, 2004.

* cited by examiner

  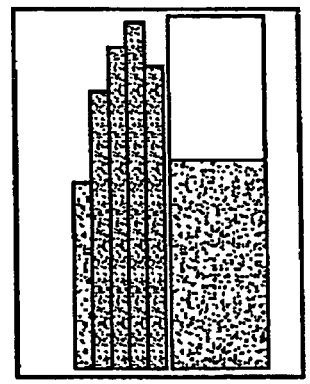
*FIG. 8a*    *FIG. 8b*    *FIG. 8c*
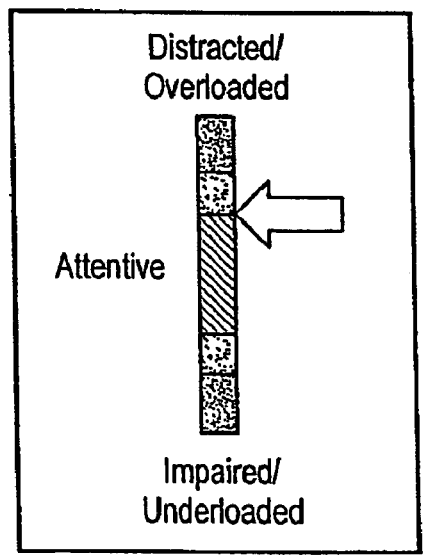
*FIG. 9*

US 7,639,148 B2

METHOD AND ARRANGEMENT FOR CONTROLLING VEHICULAR SUBSYSTEMS BASED ON INTERPRETED DRIVER ACTIVITY

CROSS-REFERENCE TO RELATED APPLICATION(S)

The present patent application claims the benefit of U.S. Provisional Application No. 60/320,253 filed 6 Jun. 2003; said application being expressly incorporated herein by reference in its entirety.

TECHNICAL FIELD

The present invention(s) relate to systems and methods that facilitate driver safety; and more particularly, to adaptations to control strategies of vehicle subsystem based on measured levels of presently existing driver inattentiveness to driving tasks.

BACKGROUND ART

Drivers of all types of vehicles are often unaware of the effects that drowsiness and distraction have on their own abilities for vehicle control. Humans in general, and particularly as drivers, are poor judges of their own performance capabilities. Typically, a driver's self-impression of his or her capabilities is better than actuality. Even persons who have basically good driving skills, will not perform uniformly at all times when behind the wheel of a vehicle. Furthermore, there are many times during driving trips that very little demand is placed on the driver with respect to execution of driving tasks. As a result, drivers are lulled into states of mind where little attention is being devoted to the driving task. Not surprisingly, driver inattention is a leading cause of vehicular collisions, and especially automotive collisions. According to a Nation Highway and Transportation Safety Administration (NHTSA) study of over two and one-half million tow-away crashes in a year's time, driver inattention is a primary cause of collisions that accounts for an estimated twenty-five to fifty-six percent of crashes. In that study, inattention was defined as having three components: visual distraction, mental distraction (looking without seeing) and drowsiness. Common crash types caused by inattention are: rear-end collisions, collisions at intersection, collisions while lane changing or merging, road departures, single vehicle crashes, and crashes that occur on low speed limit roadways.

Drowsy drivers are a well known phenomenon. At least one survey has indicated that fifty-seven percent of drivers polled had driven while drowsy in the previous year, and twenty-three percent had actually fallen asleep at the wheel. It is known that fatigue impairs driver performance, alertness and judgment. Collisions caused by drowsiness are a serious road safety problem, and fatigue has been estimated to be involved in as many as twenty-three percent of all crashes.

From a technological perspective, there is an ongoing and rapid increase of new information systems and functionalities that may be used within vehicles including mobile telephones, navigation aids, the internet, and other types of electronic services. The effect of mobile telephone use on drivers has been foremost in the public eye because of their widespread use, but sales of navigation aids and IT services are also growing fast. Mobile telephones alone have been estimated to have caused 300-1000 fatalities in one year's time in the United States, and this is projected to reach 4000 fatalities per year in 2004. Distractions such as handheld telephone use, sign reading, eating food, interaction with other passengers, observing objects and manipulating devices in-the vehicle have the potential for capturing a driver's attention in an excessive way and thus also compromising safety. It is especially important that driving safety not be compromised as these new types of services and activities become more common place in the driving environment.

Driver workload increases based on utilization of these new functionalities and technologies. In this context, "workload" should be understood to refer to how busy a person is and the amount of effort they need to perform required tasks. When a driver has many things to do and is experiencing high workload, a high attention demand is being made on the driver in that there is much to be done at the same time. Drivers often attend to things that are not related to driver control of the vehicle and are therefore technically irrelevant to the driving situation. These things are often called secondary tasks and are potential distracters from driver attention to primary driving tasks. A secondary task becomes a distraction (including visual-, auditory-, cognitive-, and biomechanical distractions) when the driver's attention is captured thereby to a degree that insufficient attention is left for the primary control tasks of driving. As a result, driving performance such as lane keeping and speed control are compromised as ultimately is safety.

Driving tasks and secondary tasks overlap in the sense that some secondary tasks are driving related as diagrammatically shown in FIG. 1. Two difficulties arise from this relationship between the driving and secondary tasks. First, it can be difficult to delineate which secondary task information is "irrelevant to the driving situation" and which is not; and second, certain driving related secondary tasks, for instance, looking for a street sign or planning a driving route may also compromise safety as graphically depicted in FIG. 1.

It should also be appreciated that the driver is often unaware of the effects of distraction on the driving task. Also, drivers cannot reliably determine when they are impaired by fatigue to the point of having a serious vigilance lapse or uncontrolled sleep attacks. The attention management systems outlined herein are intended to increase safety by assisting the driver in drowsy, distractive, and/or high workload situations.

SUMMARY OF THE INVENTION

As diagrammatically exemplified in FIG. 15, at least one embodiment of the present invention takes the form of a method for controlling a subsystem of a vehicle that is dependent upon a sensed level of driver inattentiveness to vehicle driving tasks. A variable characteristic which correlates to a driver's inattentiveness to vehicle driving tasks is measured on a substantially real-time basis. The driver's present level of inattentiveness to vehicle driving tasks is then assessed based at least partially on the measured variable characteristic. These first two steps are diagrammatically illustrated in the top two blocks of FIG. 14. After the level of inattentiveness of the driver is assessed, the performance of a subsystem of the vehicle is tailored based thereupon, and in this manner it is assured that behavior of the vehicle that is controlled by the subsystem of interest appropriately matches the driver's present level of inattentiveness. This last step would be diagrammatically illustrated by inserting it into the lower block of FIG. 14, in place of Provide Driver Feedback of Assessment.

DESCRIPTION OF THE DRAWINGS

FIGS. 8(a)-(c) illustrate various "active" graphical displays for displaying real-time driver information;

FIG. 9 provides an illustration of real-time driver feedback in a comparative format against an indication of an optimal level of attention;

MODES OF THE INVENTION

Figure 7:
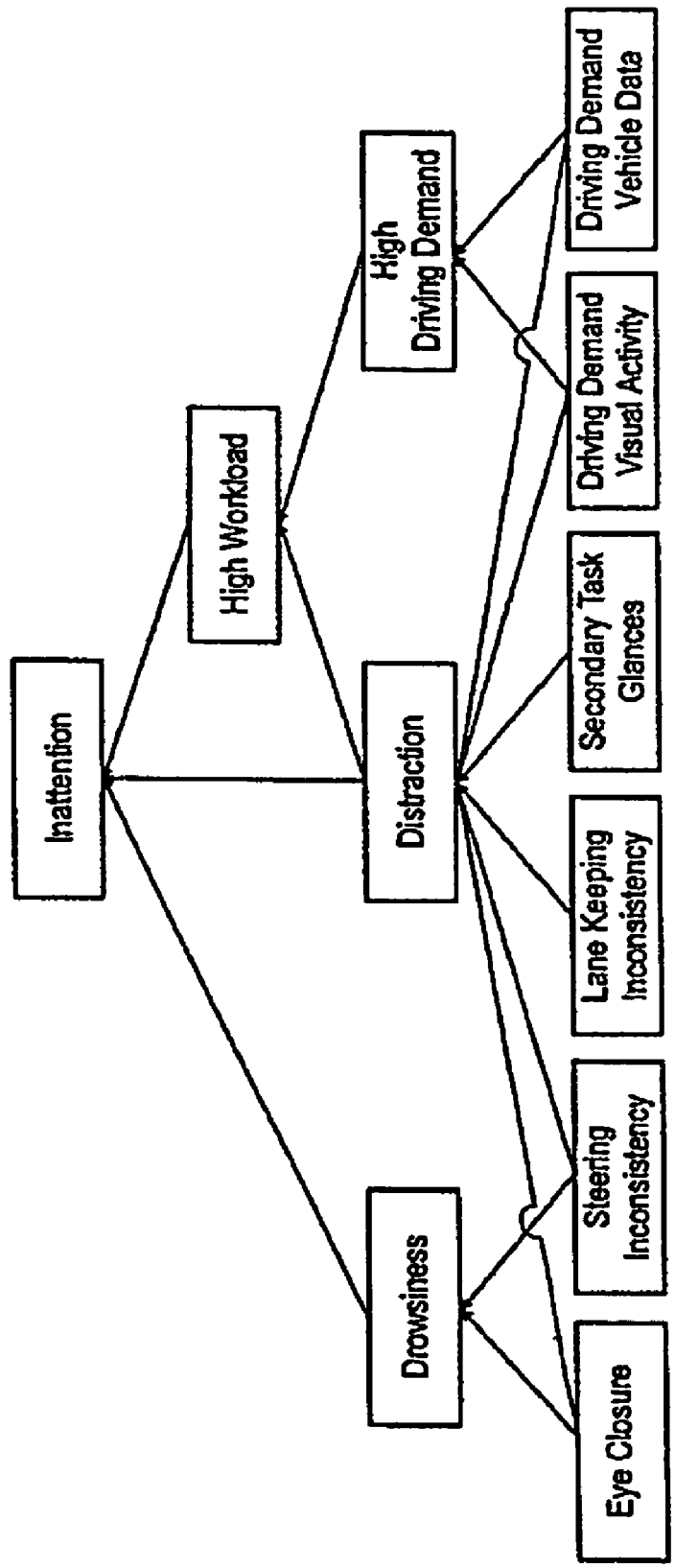
FIG. 7 diagrammatically illustrates interaction of constituent components of driver inattentiveness.

Inattentiveness to driving tasks is an important contributor to vehicle crashes. Inattention (also referred to as inattentiveness) is a state of mind which originates within the driver and has a number of causes. The concepts of drowsiness, distraction, and high workload are outlined herein, and are schematically represented in FIG. 7 as being causes of inattention. Further, inattention can be induced by other factors as well. Driver inattentiveness to driving tasks is also known to derive from, or at least be symptomatically enhanced by the effects of alcohol, illegal drugs, prescription medication, medical conditions, old age, and driver inexperience.

These different causes of inattention have different symptoms or behavioral "signatures," and as such, can at times best be identified using specifically tailored sensors and/or detection algorithms. For example, drowsiness detection may employ a sensor that measures eyelid opening, detection of high workload may employ yaw rate sensor(s), and distraction detection may employ a gaze sensor that tracks the driver's head or eye position/movement. Many of the specific data treatment calculations are tailored based on the applicable vehicle subsystem or function.

Cruise control is a common vehicle subsystem or function of modern vehicles which exemplifies a driver task that has been automated by the vehicle. Its purpose is to keep the vehicle traveling at a constant speed which is set by the driver. A control mechanism maintains the speed despite disturbances such as inclines or wind. Typically, the driver is required to turn on the system and indicate a desired speed. If for some reason the driver wishes to slow down when approaching a curve, stopping, or if a vehicle traveling in the same lane at a slower speed is encountered, the driver can step on the brake or clutch, push a button or otherwise indicate that the cruise control should disengage its goal to reach the desired speed and the system is put into a stand-by mode. By pushing a resume button (or other indication), the cruise control will attempt to regulate the speed of the vehicle, accelerating or decelerating to achieve the previous set-speed. It is also common to permit the set-speed to be driver adjusted to a new desired speed. At any time, the system can be turned off and the driver is left to maintain speed with his own actions, usually via foot pedal controls.

Cruise control reduces the amount of monitoring and actions that the driver must make to maintain a certain speed. However, available cruise control systems require the attention of the driver to detect when it should be disengaged. If the driver does not detect an oncoming hazard, such as a stopped vehicle, the system will not stop automatically.

Drowsy drivers are prone to falling asleep and missing or reacting late to potential collisions because of reduced attention to the driving task. A driver who falls asleep while driving with cruise control engaged at a set speed will not be able to react and detect when it is appropriate to disengage cruise control and apply the brakes. Similarly, a driver who is distracted away from the driving task, for example because of reading a map or book, may not be able to appropriately detect potential collisions and reduce his speed. A vehicle with cruise control engaged and an inattentive driver is inherently, or at least potentially dangerous. Indeed, a consumer may decide not to purchase the cruise control function because of the possibility that drowsy drivers using the vehicle may fall asleep with the cruise control on and an accident would be more likely to occur at a higher speed than would otherwise be the case. Therefore, the present invention appreciates that it is desirable to tailor the performance of such systems as cruise control relative to the driver's inattentive state.

Adaptive cruise control is a more recently introduced automatic vehicle function which performs the same basic task as conventional cruise control, but with one exception. The adaptive cruise control function maintains the vehicle speed at a desired level if there are no objects or vehicles in front which are traveling at a slower speed than the set speed. If a slower lead vehicle is encountered, the approaching vehicle with adaptive cruise control will slow down to maintain a predetermined distance or time gap to that lead vehicle. The adaptive cruise control function is similarly potentially or inherently dangerous in that it will maintain a set-speed even if the driver is inattentive.

Another subsystem of a vehicle that may be desirably controlled according to the teachings of the present invention is lane keeping support. In this subsystem, sensors are utilized that detect the track of the lane in which the vehicle is traveling. If the course of the vehicle deviates from center-track (or other prescribed orientation to the lane), the lane keeping support subsystem interacts with the vehicle's steering to direct the vehicle to the prescribed position with respect to the lane. Typically, this feature is implemented with a controllable servo-motor that is interconnected with the vehicle's steering system. Like cruise control, this feature that is intended to benefit the driver, may actually present a danger under certain conditions, particularly during times of heightened inattentiveness. For instance, an inattentive driver may permit the vehicle to drive into an obstacle in the travel lane, which had the driver been attentive, he or she would have steered around. Regarding cruise control, the same inattentive driver may allow the cruise controlled vehicle to power into the obstacle.

In one aspect of the present invention, the information about the degree of driver distraction or drowsiness is used to control certain aspects of the vehicle, including subsystems operating, or operable thereupon. As just one example, threshold degrees of driver drowsiness and/or distraction can be applied to such systems as vehicle cruise control and/or lane keeping support. In an effort to minimize at least run-up accidents, a vehicle's cruise control may be governed to disengage, or slow the vehicle when a predetermined driver drowsiness and/or distraction level has been exceeded. Similar thresholds can also be implemented regarding driver enablement of a vehicle's cruise control. If the driver is not sufficiently attentive, systems such as cruise control and lane keeping support can be prevented from being started until the level of driver attentiveness has been brought into an acceptable range. It should also be appreciated that driver-warnings may be advantageously implemented prior to affecting disengagement of the cruise function as the disengagement threshold is being approached. This aspect is especially applicable to disablement of lane keeping support because it is important that the driver be capable of controlling the vehicle upon disengagement of that subsystem.

From the two examples of cruise control and lane keeping support, it becomes clear that there are a number of certain subsystems on vehicles that are intended to benefit the driver, but under certain conditions of elevated driver inattentiveness, actually present an increase in driving dangerousness. Therefore, the alternative subsystems of (1) cruise control and (2) lane keeping support provide two illustrative embodiments for implementing the instant invention of providing a method for controlling a subsystem of a vehicle that is dependent upon a sensed level of driver inattentiveness to vehicle driving tasks. Initially, a variable characteristic which correlates to a driver's inattentiveness to vehicle driving tasks is measured on a substantially real-time basis. In the instant description, the qualifier substantially is utilized to indicate that slight variations from absolute real-time are acceptable, but the measurement should be made quickly enough that it is representative of the driver's state at the time of interest. This having been said, the driver's present level of inattentiveness to vehicle driving tasks is then assessed based at least partially on the measured variable characteristic. The variable characteristic that is measured and assessed may be a direct physiological characteristic of the driver such as eye closure or head position as described hereinabove, or it may, for instance, be a vehicle characteristic such as yaw-rate which is an indirect measurement of the movement of the driver's hand(s). In any event, the measured characteristic directly correlates to an aspect of the driver that can be interpreted as a predictor, sign or indicator of driver inattentiveness level.

After the level of inattentiveness of the driver is assessed, the performance of a subsystem of the vehicle is tailored based thereupon, and in this manner it is assured that behavior of the vehicle that is controlled by the subsystem of interest appropriately matches the driver's present level of inattentiveness. In the examples of both cruise control and lane keeping support, respective predetermined levels (which may be the same or different) of inattentiveness may be selected. When measured inattentiveness levels exceed the respective limit, the subsystem, be it the cruise control or lane keeping support feature, is prevented from being driver-engaged. The purpose of this limitation on the subsystem's activation is readily appreciated; if a driver is sufficiently inattentive, regardless of the cause, it is undesirable to allow the vehicle to self-power (cruise control) or self-steer (lane keeping support) into a collision.

Therefore, it is a further development of the invention to control operation of the subsystem to avoid (reduce the likelihood or probability) or prevent the establishment of driving conditions that are inherently more dangerous as the driver's level of inattentiveness increases. Looking again to the examples of cruise control and lane keeping support, as a driver becomes more inattentive to driving tasks, the more dangerous the driving condition will be when the subsystem takes control of the vehicle. At a minimum, the more inattentive the driver is, the slower his or her perception, information processing and action/reaction time.

As otherwise disclosed herein, the assessed level of existing inattentiveness to vehicle driving tasks may be based on one or more of the characteristics including: workload; distraction; drowsiness; and impairments such as alcohol and drug effects.

One way of preventing the subsystem from instituting the above-referenced dangerous driving conditions is to prevent engagement of the subsystem when driver inattentiveness is determined (assessed) to exceed a predetermined threshold level. Examples of such a threshold could be the EU's recommended four glances, the US' two second single glance duration, or the American Automobile Association's recommended ten second total glance duration for assessing glance behavior safety.

Alternatively, or as an enhancement to preventing the engagement of a subsystem as discussed above, the present invention can also act by disengaging performance of the subsystem of the vehicle, on an automated basis, after there has been an assessment of the driver's present level of inattentiveness that exceeds a predetermined threshold level. Regarding the example of cruise control, safe disengagement is rather straight forward; power is cut to the drive wheel(s) and the vehicle is allowed to begin coasting. As explained above, in the example of lane keeping support, prior to disengagement, assurance must be made that the driver is ready to take immediate control of the vehicle's steering. By way of example, a pulsed squeeze by the driver on the steering wheel could be required as a prerequisite to lane keeping support disengagement.

In an effort to prevent the driver from being taken by surprise at the subsystem's disengagement, a pre-warning may be advantageously provided.

Still further, the invention also contemplates permitting the driver to abort automated disengagement of the subsystem of the vehicle. For instance, it is possible that the assessment of inattentiveness is faulty, and therefore an operator override would be advantageous.

In the example of cruise control being the subsystem of interest, it is also contemplated that the invention can institute a reduction in the set speed of the cruise control when excessive inattentiveness is detected and thereby control the subsystem-instituted dangerousness of the established driving condition.

The attention management systems and methods disclosed herein have as an objective to increase safety by assisting drivers in drowsy, distractive, and/or high workload situations. Functional specifications are provided for a number of attention management systems that can be characterized to include drowsiness managers, distraction managers, managers for distraction adaptation of forward collision and lane change warning systems, and workload managers that are at least in part controlled based on driving demand estimations observed or deduced from visual behavior of the driver. A hardware system that can be suitably employed to perform these driver attention management tasks is also described. A "platform" for development of the instant drowsiness and distraction manager based on Human Machine Interaction (HMI) is also disclosed, as is description of continuous and post-trip attention feedback systems. The HMI approach has as an objective thereof to counteract driver inattention by providing both imminent collision warnings, as well as attention-feedback to cause positive behavioral change.

A system and method are also described that enable the implementation of attention management concepts in a vehicle, including exemplary hardware upon which the functionalities can be accomplished. Several basic questions and goals are addressed herein, including: what visually derived support do drivers need and how should it be conceptualized to achieve acceptance; how can real-time recognition of driver visual behavior be applied to reduce driving errors and prevent accidents; what is the commercial feasibility of implementation. Functional descriptions are provided for exemplary drowsiness managers; distraction managers, distraction adaptation of forward collision and lane change warning systems; and workload managers. Systems and methods for implementing driving demand estimation from visual behavior are also included.

One or more of these systems and methods are individually, as well as collectively, described as making-up a so-called attention management system. One possible component of these systems is the attention support demonstrator that can be used to implement these systems and methods for demonstration and testing. Examples of driving demand estimation from visual behavior are also described herein.

Figure 1:
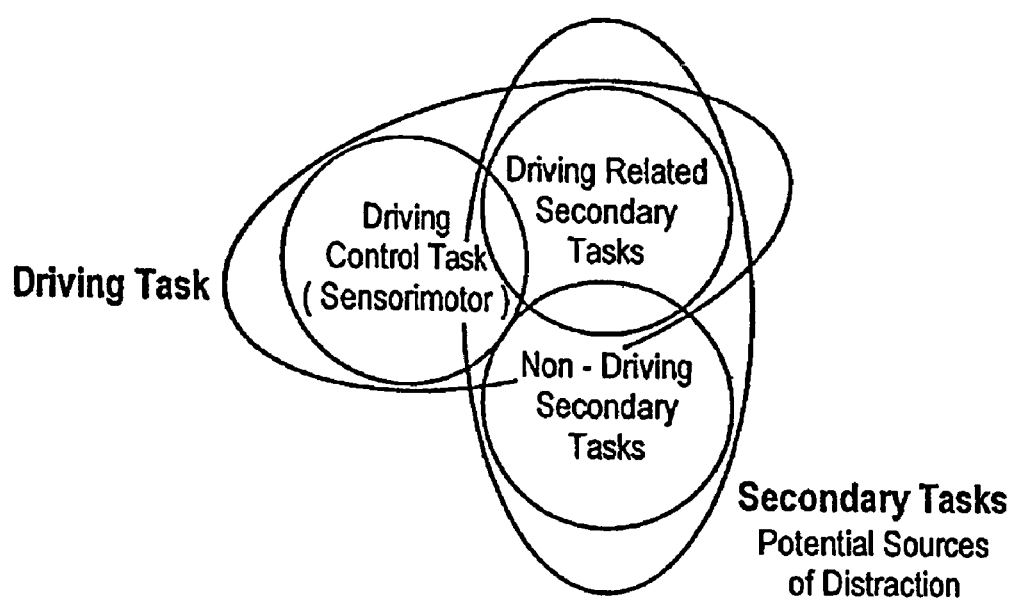
FIG. 1 is a diagrammatical representation of the inter-relationship of driver and driver secondary tasks.
Figure 2:
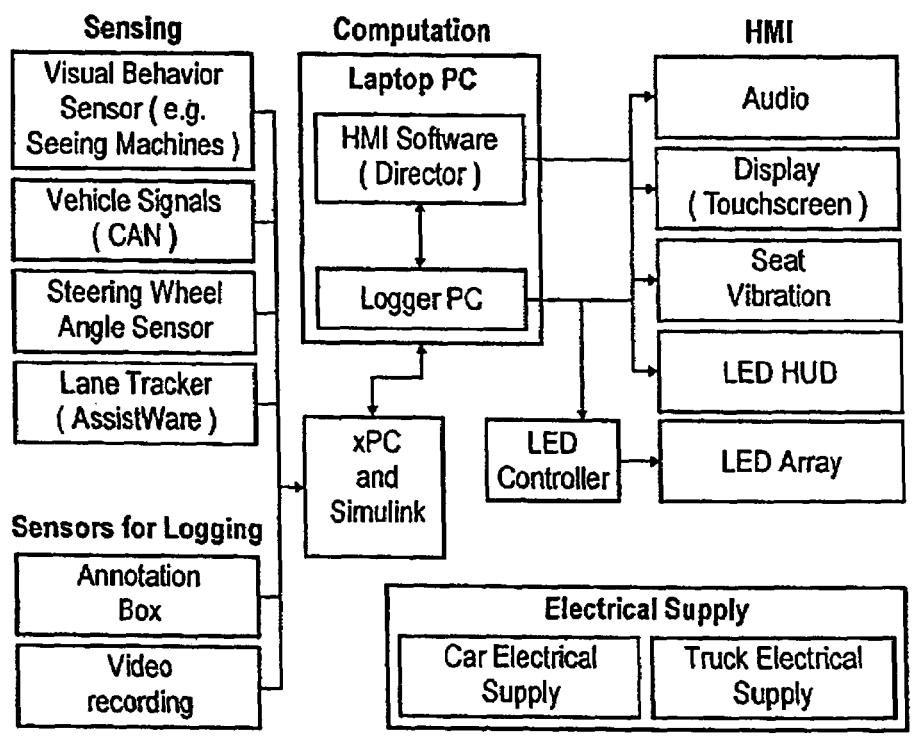
FIG. 2 is a flowchart representing one embodiment of an attention management system that includes hardware and functional modules for sensing, computation, HMI, and electrical supply.

In one embodiment, the attention management system includes hardware for (1) sensing, (2) computation, (3) HMI, and (4) electrical supply. The units or functional modules can be exemplarily configured (interrelated) as illustrated in FIG. 2, and are suitable for implementation in such vehicles as automobiles and trucks.

A visual behavior sensor is employed such as that which is available from the company, SeeingMachines, and which can be adapted to be installed in a vehicle. This type of system can include (1) a stereo camera head, (2) a personal computer (PC), and (3) appropriate driving software. A visual behavior sensor such as that produced and sold under the trade name SMARTEYE may also be optionally employed.

Vehicle performance signals can be acquired from the CAN bus. A steering wheel angle sensor can also be utilized, as well as lane tracking hardware and software. An annotation box and video recording hardware is utilized. An onboard personal computer or similarly capable computing device is utilized. Alternatively, and especially to facilitate testing and implementation, a laptop computer can be employed that exemplarily runs such software as "Director" and "Simulink." An xPC can also be installed and utilized. From a hardware perspective, LED controller hardware is employed. Audio HMI (warning sounds, recorded messages) are provided for via the computing device. A touch-screen for user input can also be utilized. It should be appreciated that some of these embodiments are suitable for product development and facilitate system testing, but when commercialized, the several components are integrated directly into the vehicle.

A seat vibration arrangement or similar driver alert can be included. In a preferred embodiment, a LED HUD (heads up display) is employed. A LED array (display), controlled by a LED controller can also be utilized. An electrical supply for the entire system can be tapped from the carrying vehicle.

A drowsiness manager can be implemented in two configurations. In a first example, it is entirely PC based; that is, no external hardware or external communication capabilities are required. This embodiment is scenario based; that is, tracking of a drowsiness episode based on real PERCLOS (analysis that considers scan patterns, number and length of fixations, saccade latency and the like) data rather than in real-time. The hardware functionality stimulates the driver via such stimuli as a visual display such as LED-based or HUD, or physical stimulation such as seat vibration. In another embodiment, HMI hardware and Simulink communication is implemented.

A "platform" upon which several drowsiness manager countermeasures may be implemented is desirable, and upon which tests may be conducted. An exemplary platform for such implementation is schematically illustrated in FIG. 3.

Figure 3:
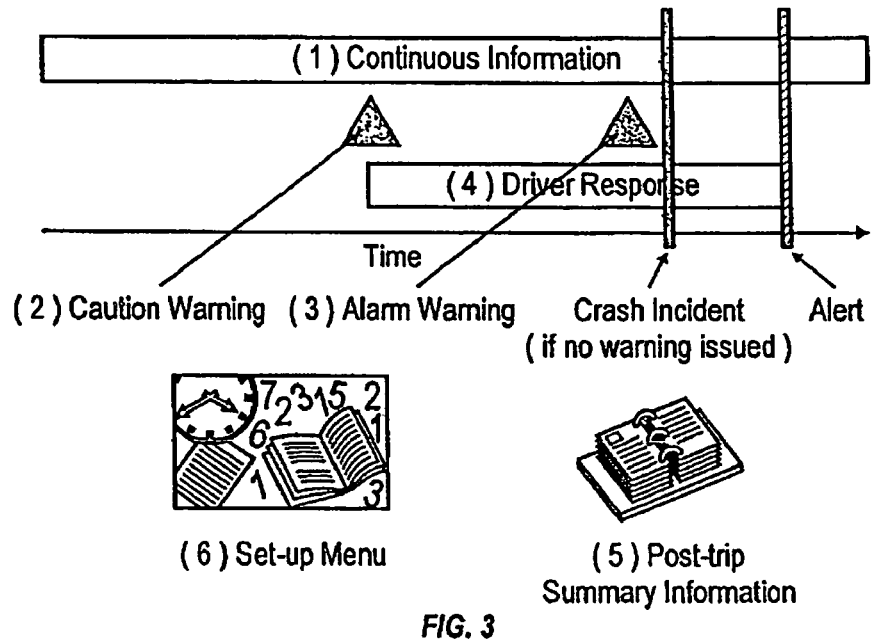
FIG. 3 is a diagrammatical representation of a platform upon which several drowsiness manager countermeasures may be exemplarily implemented.
Figure 4A:
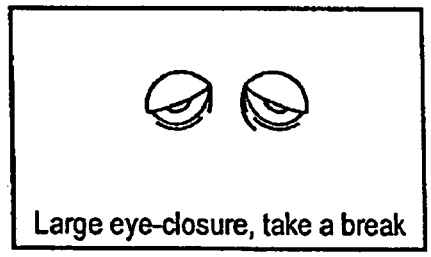
FIG. 4 depicts exemplary representations of possible display warnings to a driver.
Figure 4B:
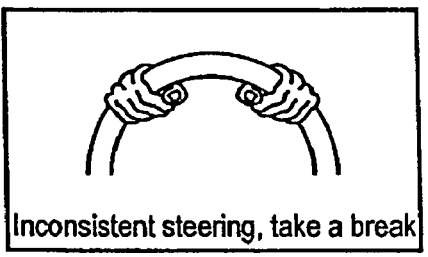
Figure 4C:
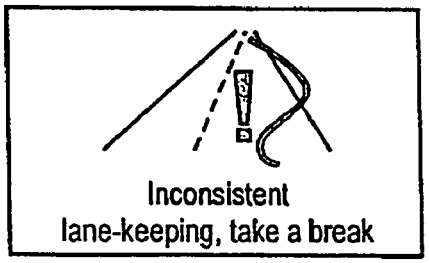
Figure 4D:
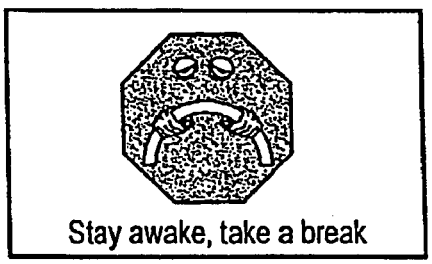

The illustration of FIG. 3 may be considered to depict a director program. Such an arrangement is easy to change with respect to different HMI components; for instance, to provide (1) continuous information streaming to the driver, to provide (2) cautionary warnings, (3) eminent danger warning alarms, (4) driver response tests, (5) post trip summary information, and (6) operator input set-up menu(s).

The provision of a caution warning to the driver is facilitated. The driver is able to choose between warning versions, but is not able to completely disable the warning. Exemplarily, a beep followed by an optional voice message warning can be played to the driver such as "<automated insertion of drowsiness cause>, 'take a break.'" An icon can be alternatively displayed to the driver either individually, in conjunction with an audible warning, or together with a printed version of the warning.

Exemplary icon warnings are shown in FIGS. 4(a)-(d) for (a) large eye closure detection, (b) inconsistent steering detection, (c) inconsistent lane-keeping detection, and (d) driver drowsiness detection. One or more of these icons can be simultaneously displayed depending upon detected driver conditions.

In another embodiment, a microphone is included so that the driver can record or supply his or her own warning much like in a telephone answering machine and other customizable audio play-back devices.

In still another embodiment, driver physical-stimulation warnings are applied. Preferably, the driver can choose between warning-types in the set-up menu, but in at least one embodiment the operator is prevented from completely disabling the physical warning. An example of such a physical stimulation would be seat vibration.

In another version, a flashing "HUD" LEDs may be used to sharply stimulate the driver; again, alone or in conjunction with the other types of warnings described herein. In a preferred embodiment, capabilities are provided to the driver for enabling up to three of the described warning types to be simultaneous presented when active.

A driver response functionality; that is, reaction-time to a signal, is also provided. With regard to this functionality, the driver is able to both enable and disable, as well as choose between warning versions in the set-up menu.

Figure 5:
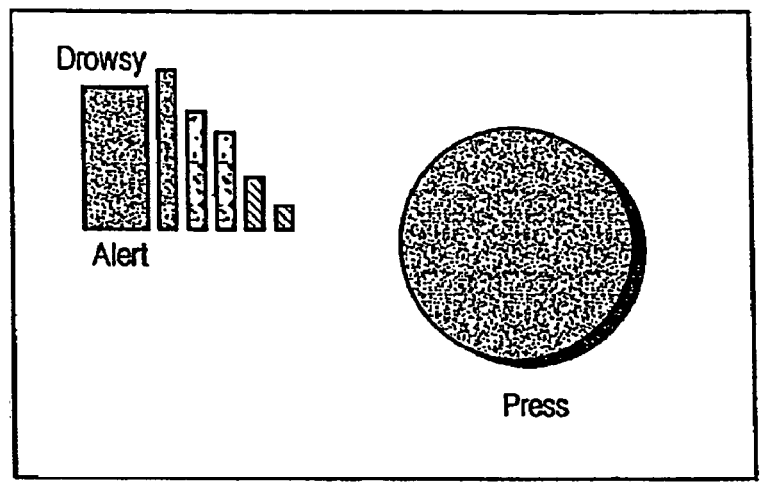
FIG. 5 depicts an exemplary, interactive, driver response panel.

In a predetermined amount of time, for example five to eight seconds post-warning, a driver response function operates. Exemplarily, there will be a beep, with text "Press" under a button presented on a touch screen as illustrated in FIG. 5. If the driver does not react within the prescribed amount of time, or according to some other reaction time based algorithm, then an alarm warning will issue. This continues until the driver stops the vehicle, becomes alert and this fact is system-detected, or the driver turns the function off.

A distraction manager can be exemplarily implemented in two embodiments. In a first embodiment, the distraction manager is entirely PC based with no external hardware or communication capabilities. It is scenario based; that is, a timeline of a distraction episode is given rather than in real-time. The hardware functionality is simulated. A second embodiment is based on a hardware implementation that includes the capability of real time communication.

Another aspect of the present disclosure is safety threshold based distraction warnings. Warnings are provided that inform the driver of safety compromising distractive behavior. As appreciated hereinabove, drivers are often unaware of the effects of their distraction on their driving capabilities. Thus a goal of the safety based distraction warnings is to give the driver feedback about driving control task performance decrements. That is, if distraction is detected (i.e. glance behavior is over an appropriate safety threshold and/or vehicle performance deteriorates during glance behavior), the system provides one or more of the following alerts. A sound such as a simple beep or a performance-specific voice message referring to which performance decrements have been detected may be provided. For example, if glance behavior is above glance safety threshold standards (e.g. EU recommended 4 glances or 2 second single glance duration, US AAA recommended 10 second total glance duration), then the message "Visual Distraction Detected" or "Eyes off road extensively" can be issued. If steering is deviant during secondary task glance behavior, then the message "Inconsistent steering during visual distraction" can be issued. If lane keeping is deviant during secondary task glance behavior, then a message such as "Inconsistent lane-keeping during visual distraction" can be provided. If large speed reduction is detected during secondary task glance behavior, then a message such as "Large speed reduction during visual distraction" can be issued. If multiple causes are detected, then a generic message such as "Visual distraction detected" can be issued. If control task intrusion is detected during secondary task glance behavior, during road types different demand levels, then a corresponding warning is issued. The form(s) of the warnings can include a driver recorded or provided message, a seat vibration in a front part of seat or gaze redirection as described hereinbelow.

In an alternative embodiment, the information about the degree of driver distraction or drowsiness can be used to control certain aspects of the vehicle, including subsystems operating, or operable thereupon. As just one example, threshold degrees of driver drowsiness and/or distraction can be applied to such systems as vehicle cruise control. In an effort to minimize at least run-up accidents, a vehicle's cruise control may be governed to disengage, or slow the vehicle when a predetermined driver drowsiness and/or distraction level has been exceeded. Similar thresholds can also be implemented for enabling cruise control. If the driver is not sufficiently attentive, systems such as cruise control can be prevented from being started until the level of driver attentiveness has been brought into an acceptable range. It should also be appreciated, that driver-warnings may be advantageously implemented prior to affecting disengagement of the cruise function as the disengagement threshold is being approached.

Such features as drowsiness detection are especially important when considering vehicle systems that tend to relieve the driver from driving tasks thereby facilitating relaxation that can foster excessive drowsiness.

Figure 6:
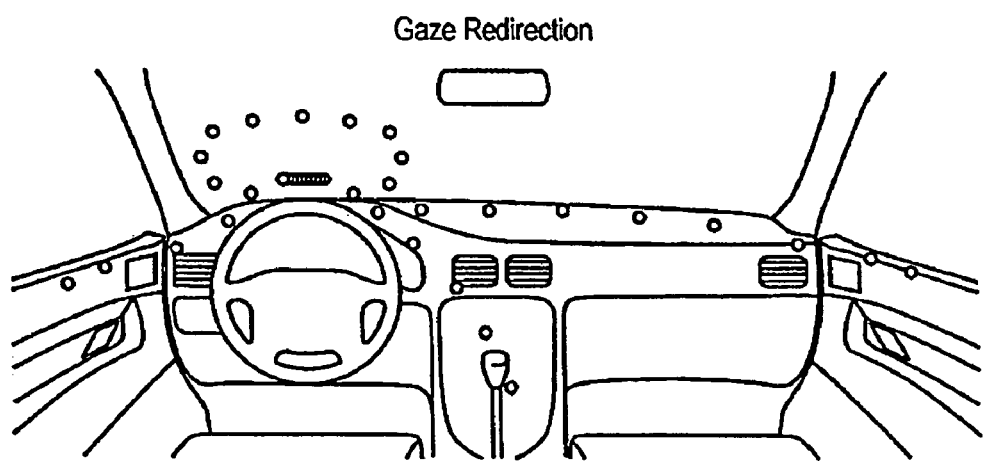
FIG. 6 depicts an exemplary embodiment for driver gaze redirection.

A new concept of "gaze redirection" is disclosed and that is illustrated in FIG. 6. Therein, an interface directs the driver' eyes to the forward driving scene (i.e.; through the front windshield) if driver distraction is detected. Exemplarily, a wave of light following one or more of the three LED "lines" (left, center, or right) will be initiated depending on where the drivers' gaze detected. After a wave of light, a large circle may optionally light up and then the central line of LEDs will light up; each purposed to more clearly focus the driver's attention where needed. The exact placement and timing of the several LED lights is not critical, nor is the color. In fact, the timing may be subliminal; that is, so fast that they are not consciously perceived. Alternatively, the appropriate lights may be first slowly flashed and the driver evaluated by the system to determine if corrective behavior has taken place. If not, the flash timing, as well as light intensity may be increased.

In another aspect, the concept of workload management is incorporated with driving demand estimation derived from visual behavior of the driver. In general, the concept of a "workload manager" is a prioritization system that categorizes information and potentially delays presentation of the information to the driver until his or her workload is sufficiently low to avoid risk associated with the information's reception. The interfaces of integrated, in-vehicle information systems can be adapted to ensure that proper attention is being given to the driving task. The output from the distraction management algorithms referenced herein can be used as input to workload managers.

Workload managers of the type disclosed herein accurately measure driver workload using the driving demand visual activity measure of driving demand. This is a measure of how "visually active" a driver is; that is, head and eye movement (rotation) variability. This measure of head and eye movement is described in greater detail in U.S. Provisional Patent Application No. 60/418,171 filed 15 Oct. 2002, the disclosure of which is expressly incorporated herein by reference, including the "visual activity" algorithm described therein. Furthermore, the driving demand visual activity measure also enables new functionality in the Workload Manager HMI, disclosed herein.

One aspect of the workload manager is to pause dialogue of an audible conversation or information. As examples, this includes system-initiated or auto-initiated information (e.g. text-to-speech email and non-critical navigation system information) and randomly-initiated spoken dialogue (e.g. incoming and outgoing telephone conversations) can be paused during periods of high visual activity.

As an example, a series of emails can be being delivered to the driver, for example, ten new emails from memory that are being "read" out loud by a text-to-speech system. During the course of such audio transmission, a period of high driver visual activity is detected by the management system. In response, the system pauses the audio transmission to avoid increasing the driver's attention load beyond pre-selected levels; such levels exemplarily corresponding to attention loads beyond which driving capabilities are compromised. Optionally, the management system can include an audible indication to the driver of such interruption via a tone or the like which may also serve as notice to the driver of the high attention load condition. The audible transmission can be resumed based on driver initiation or system initiation that is dependent on the system's detection of a sufficient reduction in attention load to a pre-selected level exemplarily corresponding to safe conditions for driver receipt of such audible information.

In another aspect, continuous and/or post-trip attention load feedback is enabled via the disclosed management system. This aspect has been enabled pursuant to the fundamental human behavior characteristic commonly referred to as the feedback principle; such principle generally holding that feedback enhances performance. This is true for both task/skill learning (e.g. learning to drive safely) and for job motivation. As appreciated hereinabove, drivers are typically poor judges of their own performance. The degree to which direct, accurate, immediate, and continuous information on task/skill performance is available is a key element in enhanced driver performance and motivation. Attention feedback constitutes a form of intrinsic driving feedback that has heretofore been otherwise unavailable to the driver. The approach is one of positive behavioral adaptation and lifestyle change rather than imminent collision warning. For example, some researchers believe that the main mechanism for increased alertness is "decision influence." The concept of decision influence stipulates that information of this nature (driver attention load and state-of-alertness) will influence a driver' decision about whether to stop for rest, drink coffee, reduce alcohol consumption or change other such behaviors.

An objective of attention feedback is thus to encourage positive behavior change over one or more of a plurality (multiple) of time-frames, for instance: (1) immediate (e.g. short-term compensatory behaviors like changing posture or aborting a complicated task); (2) trip (e.g. stopping for a nap, turning off mobile phone); (3) day-to-day (sleeping more after a low attention day, removing video screen from front seat); (4) and long-term (adoption of a different sleep lifestyle or distraction attitude). This feedback increases driver self-awareness of inattentive behavior and enables better self-management.

Two main feedback types are considered. The first is continuous in-vehicle feedback that provides the driver with real-time attentive performance information, for example information presented while driving. This information is communicated in a way that, in itself, does not jeopardize safety. The concept is to provide a sort of attention-meter, alertness meter (alert-o-meter), or safe/unsafe driving performance meter. The second feedback type is post-trip feedback that provides the driver with more detailed attentive performance information once driving has stopped.

Saving post-trip feedback "to file" further allows fleet-based safety feedback to focus on source behaviors as opposed to outcome measures such as accident incidents. One option, perhaps contributing to driver acceptance, is the provision of a tiered system. In such a tiered system, drivers have continuous access to data, fleet managers have access to summarized data, and regulating agencies can be granted access to summary data. Therefore, in the instance of fleet drivers, the described advantages can be better enjoyed as a helpful tool, without necessarily having to induce driver apprehension about employer-reporting characteristics.

To be able to give attention feedback, the management system has to be operationalized. Inattention may be seen as being comprised of drowsiness/impairment, distraction, and high workload factors. Therefore, and as illustrated in FIG. 7, an integrated model considering each type of inattentiveness is preferred. Therein, a system model is shown that can selectively consider driver inattention, workload, and personal characteristics such as drowsiness and distraction.

Unique ways are provided for displaying various information or feedback to the driver. In the instance of continuous attention-feedback, FIGS. 8(*a*)-(*c*) demonstrate various "active" graphical displays for displaying real-time driver information that has been sensed or generated by the management system. As an example, the display can be of a "generic" or synthesized attention feedback quantity such as the level of attention/inattention as a combined measure of drowsiness, distraction, and workload. In the instance of FIG. 8(*a*), a simple stack of lights with no trend information is exemplified. In the instance of FIG. 8(*b*), an "aircraft radar type" display is utilized in which a box is positioned around the current level and trend information in the form of "fading out" is enabled. FIG. 8(*c*) demonstrates a histogram in which instantaneous "real time" information is shown as an elongating/retracting bar (relatively wide) on the right, with aggregate statistical values (average, median, and the like) for periods of pre-selected duration represented by the more narrow bars on the left. In this manner, trend information is demonstrated. In the illustrative example of FIG. 8(*c*), five previous periods are represented. It should be appreciated that any previous periods may be displayed according to the control logic for the display and memory capacity.

Figure 10:
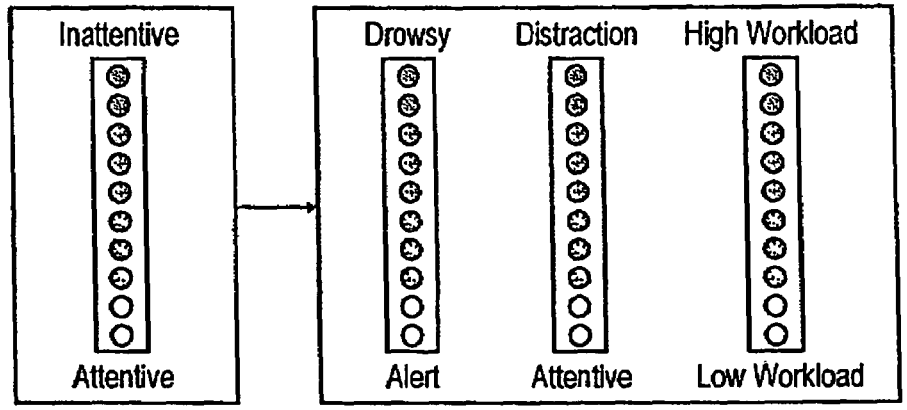
FIG. 10 provides an illustration of an exemplarily formatted explanation of the basis for the detected increased workload/inattention level.

In another aspect, real-time driver feedback is also provided in a comparative format against an indication of an optimal level of attention. An exemplary embodiment of such a display is illustrated in FIG. 9 where a driver may observe his or her degree of distraction or overload relative to optimum attentiveness. In still another aspect, it is disclosed to measure detected periods of driver inattention, with notification of the state provided. The driver may then "ask" (e.g. by touching a screen, for instance) what the problem was and receive an explanation of the basis for the detected increased workload/inattention level. Such feedback can exemplarily be provided in the form of verbal messages and/or graphically as shown in FIG. 10. Therein, three graphic representations of drowsiness, distraction, and workload are depicted on the right, and a combination of the effects is demonstrated on the left where relative driver attentiveness is indicated.

Figure 11:
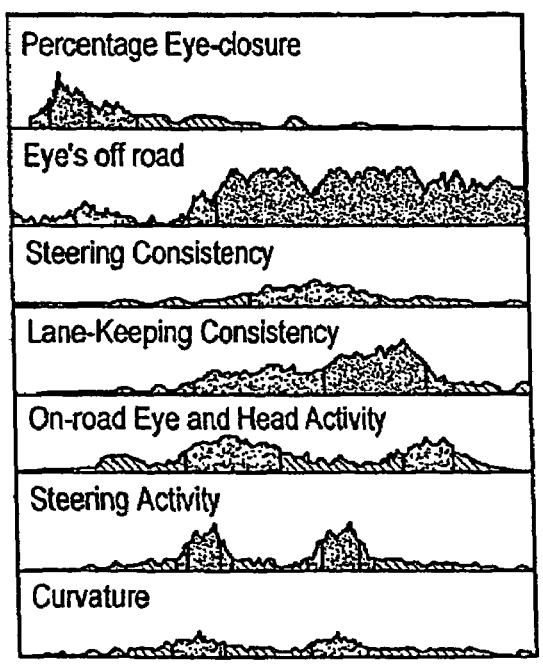
FIG. 11 provides an exemplary illustration of on-screen post-trip feedback.

As explained above, the aspect of trip-reporting can be highly advantageous for the driver' learning and behavior modification. Therefore, inventive ways to provide on-screen post-trip feedback are disclosed and exemplarily illustrated in FIG. 11. In this illustrative example, a menu choice from a display screen has been selected for post-trip feedback and the associated display of such measured characteristics as percent eye-closure, steering consistency and the like have been displayed in a historical format. Of course, this same information can advantageously be logged for later analysis and use.

The driver capabilities that have been discussed above can also be utilized for distraction adaptation of other vehicle systems such as forward-collision, rear-collision and lane-change collision warning (FCW, RCW and LCW) systems. Rear-end collisions account for approximately twenty-eight percent of automotive crashes. Because driver inattention is a contributing factor in more than sixty percent of these collisions, collision warning and avoidance systems are important tools for reducing crashes and saving lives. One objective of the present attention management systems is to detect the co-occurrence of inattention and safety critical events in the traffic environment; for example, sudden braking of a lead vehicle and driver eyes-off-road conditions. Two examples of this can be used as visual behavior information to adapt forward collision- and lane change-warnings.

Integration of detection of quantified secondary tasks (e.g. by detecting button presses or eye movements) greatly enhances the collision warning system by dynamically adjusting the collision warning threshold according to whether the driver is engaged with a potentially distracting device or other type task. For example, the collision warning system could generate a warning earlier if it is detected that the driver is involved in a cellular telephone conversation. An early collision warning helps the driver react more quickly and avoid more collisions compared to late warning, or no warning at all. If the driver is inattentive with respect to a certain aspect of the driving task, for example looking away from forward when a likelihood of forward collision is detected, or has not looked sideways when a possible lane change collision is detected, then warnings of such conditions are initiated earlier. Studies have shown that even a one second earlier warning when drivers are looking away is highly effective for avoiding collisions.

If it is detected that the driver is attentive, then the warnings can be delayed or even cancelled. A delay in warning presentation allows more time for the forward collision and lane change warning algorithms to more certainly ascertain that a warning is needed, thereby reducing false alarms. Still further, driver cancellation wherein the driver chooses not to have collision warnings active when looking at the road or side mirrors would also eliminate annoying false alarms.

Figure 12:
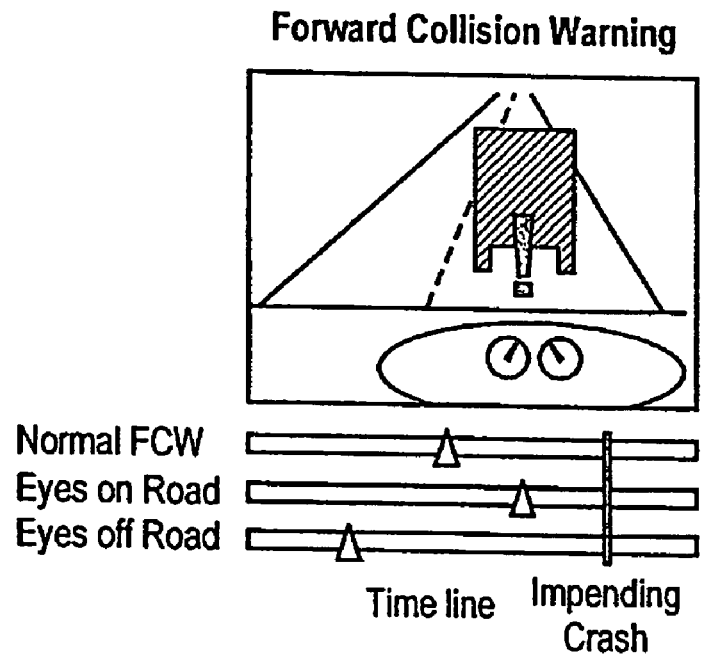
FIG. 12 provides an exemplary illustration of a heads-up or screen display warning for forward collision situations.
Figure 13:
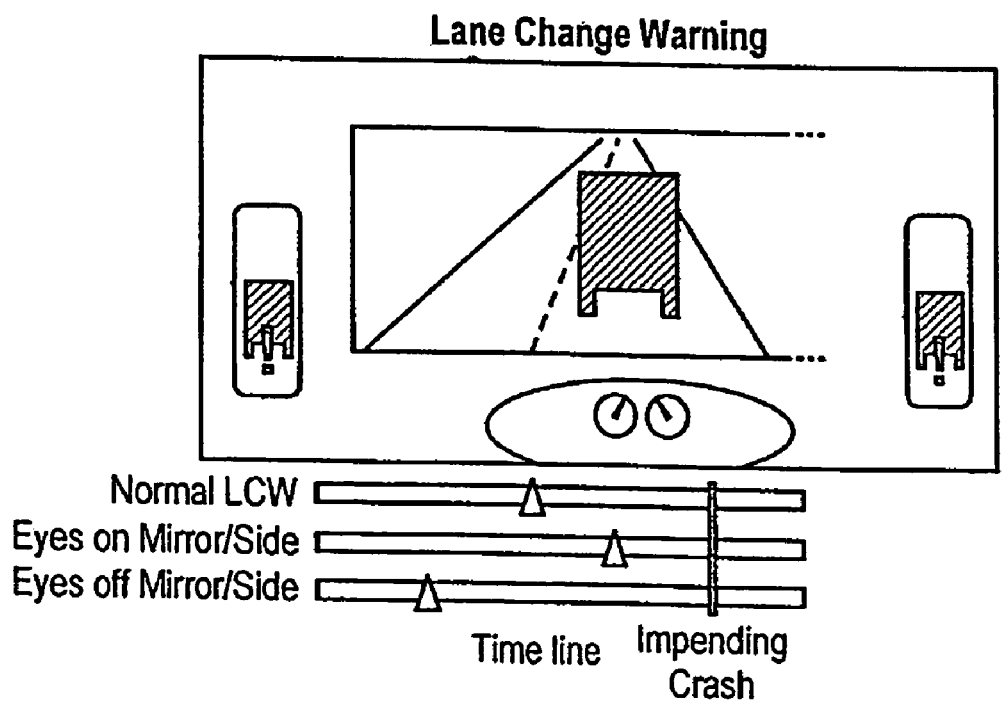
FIG. 13 provides an exemplary illustration of a heads-up or screen display warning regarding lane-change collision situations.
Figure 14:
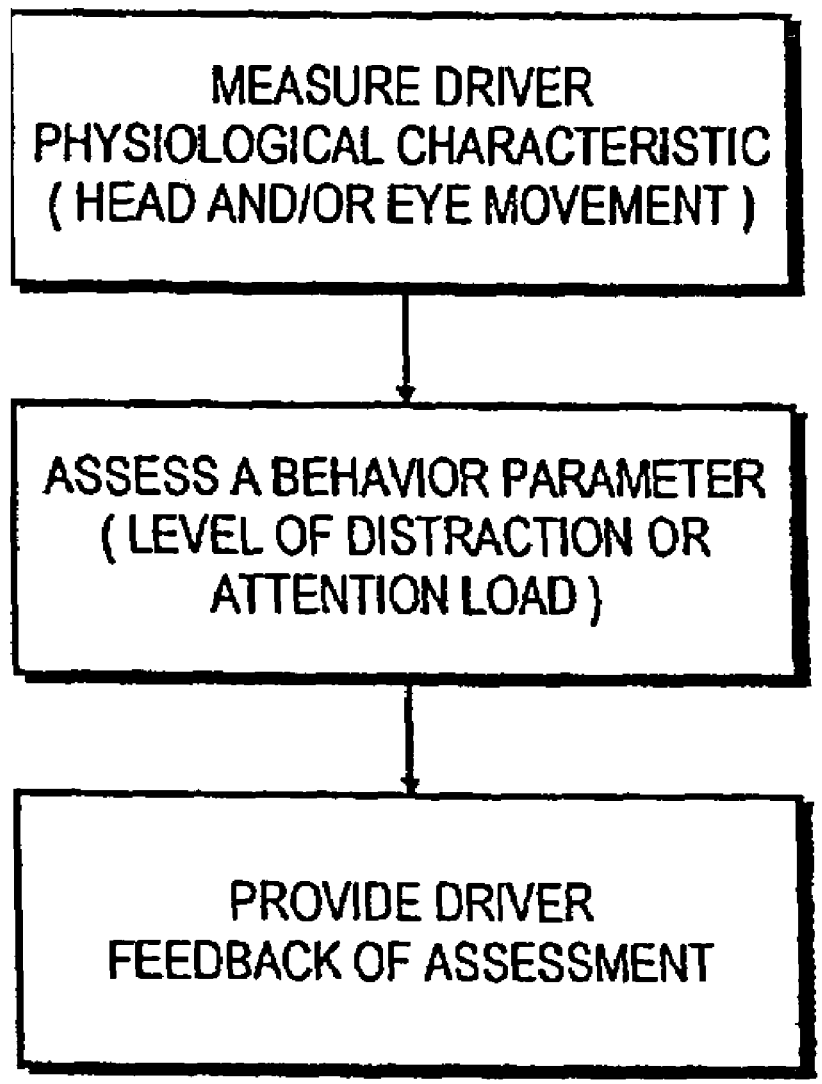
FIG. 14 provides an exemplary flow chart for a system and method in which a measure is made of a driver physiological characteristic such as head and/or eye movement. In another step, a behavior parameter is assessed such as level of driver distraction or attention load. In still another step, feedback regarding the assessment is made to the driver.
Figure 15:
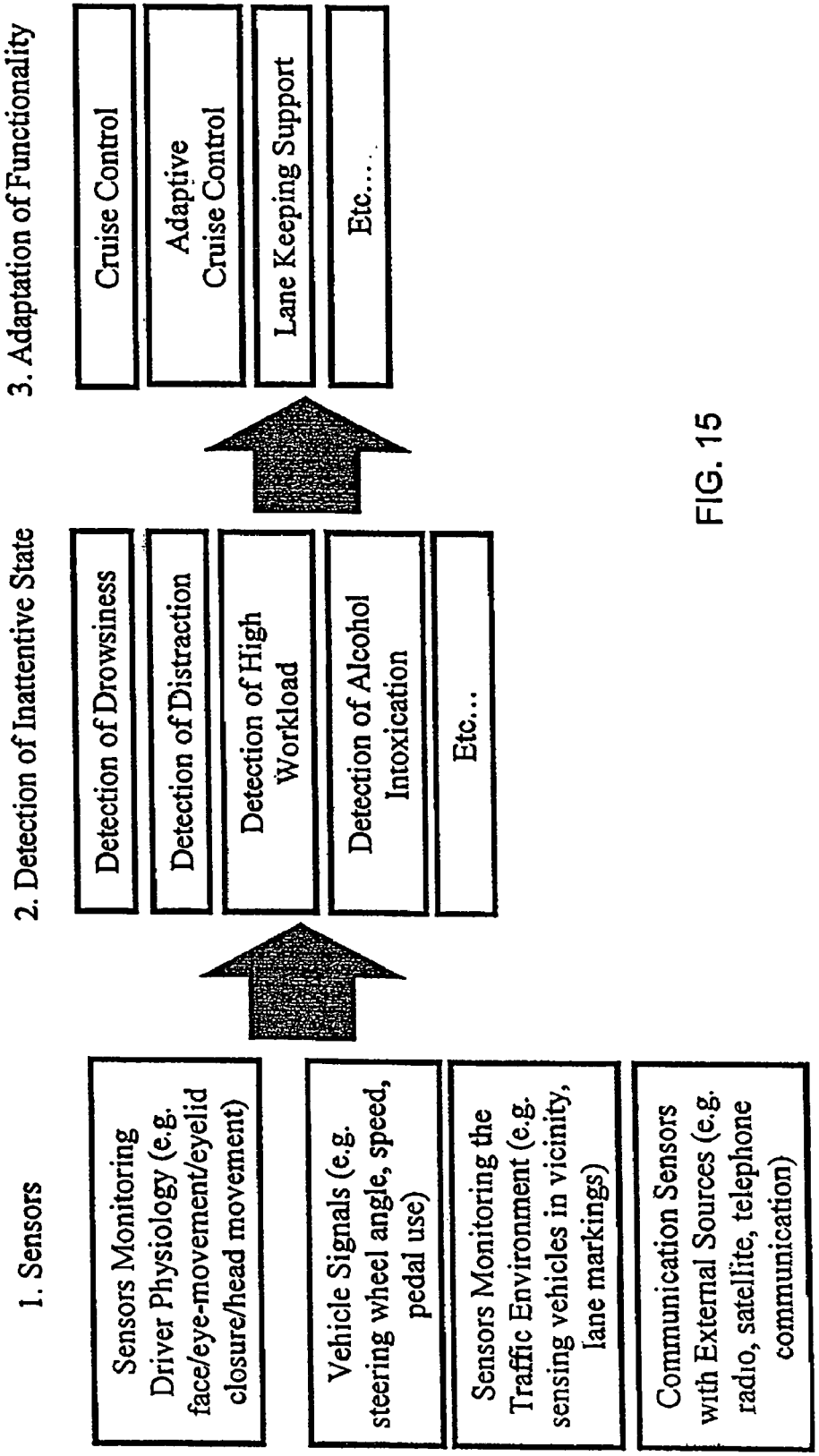
FIG. 15 is a diagrammatical chart illustrating the primary features of the present invention including measuring and assessing driver inattentiveness and then controlling a subsystem of the vehicle based thereupon.

As an implementation strategy, in a first stage, such warnings may be "soft," but increasing in intensity as conditions worsen and a crash becomes more imminent. In the instance of forward collision warning, a heads-up or screen display warning may first be called up, but later being joined by an audible warning sounded as crash conditions intensify. An example of such a warning and its control parameters (which may or may not be displayed to the driver) are depicted in FIG. 12 regarding forward collision situations and FIG. 13 regarding lane-change collision situations.

The detection features described hereinabove with regard to driver characteristics may be utilized in other environments and for other purposes than expressly described. The detection features may also be integrated for employment in other in-vehicle systems. For instance, as a passive safety feature, a "smart" airbag may be enabled that detects when the driver '/passenger' head is not in a proper position to receive a deployed airbag. Responsively, deployment of the airbag may be modified to accommodate the sensed head position.

In another capacity, sensed behavior could be used to identify the driver, or at least rule out that an authorized driver is behind the wheel thereby facilitating theft protection. The head and eye sensors could also be used to automatically configure mirrors, seat positions and the like. Mouth tracking can be used to enhance speech recognition accessories. Filters for oncoming headlights can be adapted, as can displays for the driver based on eye position and motion.

The invention claimed is:

1. A method for assessing a traveling vehicle driver's level of inattentiveness caused by excessive workload due to the driver's performance of secondary tasks and responsively adapting a vehicle motion control subsystem based thereupon, said method comprising:

taking a series of measurements of a driver's head or eye movement variability and inputting the measurements to a computer processor for analysis;

analyzing the input measurements using the computer processor and determining therefrom whether an excessive amount of driver attention is being paid to a secondary task based on an assessment of driver workload;

detecting a decrease in driving control task performance occurring simultaneously with the excessive driver workload; and preventing engagement of or disengaging the vehicle motion control subsystem based upon said assessment of the driver's excessive level of workload and the detected simultaneous decrease in driving control task performance, thereby assuring that behavior of the traveling vehicle appropriately matches the driver's present level of attentiveness to driving control tasks.

2. The method as recited in claim 1, further comprising: controlling operation of the vehicle motion control subsystem to avoid said vehicle motion control subsystem's establishment of driving conditions that become inherently more dangerous as the driver's level of inattentiveness increases.

3. The method as recited in claim 2, further comprising: controlling operation of the vehicle motion control subsystem to prevent said vehicle motion control subsystem's establishment of an inherently more dangerous driving condition when said assessment of the driver's present level of inattentiveness exceeds a predetermined threshold level.

4. The method as recited in claim 1, further comprising: disengaging performance of said vehicle motion control subsystem, on an automated basis, after said assessment of the driver's present level of inattentiveness exceeds a predetermined threshold level.

5. The method as recited in claim 4, further comprising: providing a driver warning prior to said automated disengagement of said vehicle motion control subsystem.

6. The method as recited in claim 5, further comprising: permitting the driver to abort automated disengagement of said vehicle motion control subsystem.

7. The method as recited in claim 1, wherein said vehicle motion control subsystem is a cruise control feature.

8. The method as recited in claim 7, wherein said cruise control feature is of the forward vehicle distance based adaptive type.

9. The method as recited in claim 7, further comprising: controlling said cruise control feature to reduce set speed when said cruise control is engaged and said assessment of the driver's present level of inattentiveness exceeds a predetermined threshold level.

10. The method as recited in claim 1, wherein said vehicle motion control subsystem is a lane keeping support feature.

11. The method as recited in claim 10, wherein said lane keeping support feature automatically urges, via the vehicle's steering system, the vehicle toward a predetermined relative widthwise position within the travel lane.

12. The method as recited in claim 1, wherein said step of measuring, on a substantially real-time basis, a variable characteristic which correlates to a driver's inattentiveness to vehicle driving tasks further comprises at least one step selected from the group consisting of: measuring a driver's eye movement; measuring a driver's eye-gaze direction; measuring a driver's eye-closure amount; measuring a driver's blinking movement; measuring a driver's head movement; measuring a driver's head position; measuring a driver's head orientation; measuring driver's movable facial features; and measuring a driver's facial temperature image.

13. The method as recited in claim 1, wherein said step of measuring, on a substantially real-time basis, a variable characteristic which correlates to a driver's inattentiveness to vehicle driving tasks further comprises at least one step selected from the group consisting of: measuring driver grip force on a steering wheel; and measuring movement of a steering column.

14. The method as recited in claim 1, wherein said step of assessing the driver's present level of inattentiveness to vehicle driving tasks based at least partially on the measured variable characteristic further comprises one or more steps selected from the group consisting of:
- assessing a time weighted parameter characterizing a driver's eye closure over a predetermined period of time;
- assessing a time weighted parameter characterizing a driver's off-road eye-gaze over a predetermined period of time;
- assessing a time weighted parameter characterizing a driver's blinking movement over a predetermined period of time;
- assessing a time weighted parameter characterizing a driver's head position over a predetermined period of time; and
- assessing a time weighted parameter characterizing a driver's head movement over a predetermined period of time.

15. The method as recited in claim 1, further comprising informing the driver of an assessment of inattentiveness exceeding the predetermined threshold level on a real-time basis.

16. The method as recited in claim 1, further comprising informing the driver of an assessment of inattentiveness exceeding the predetermined threshold level in the form of post-trip feedback.

17. The method as recited in claim 15, wherein said step of informing the driver further comprises a step of providing a histogram representative of a given period of time.

18. The method as recited in claim 16, wherein said step of informing the driver further comprises a step of providing a histogram representative of a given period of time.

19. The method as recited in claim 15, wherein said step of informing the driver further comprises providing a scaled comparison between a presently measured level of inattentiveness and at least one normative value thereof.

20. The method as recited in claim 16, wherein said step of informing the driver further comprises providing a scaled comparison between a presently measured level of inattentiveness and at least one normative value thereof.

21. The method as recited in claim 1, further comprising providing the driver with a feedback message on how the driver's attitude should be changed to become less inattentive.

22. The method as recited in 1, further comprising determining that the driver's level of inattentiveness is outside a safety range, and informing the driver that the safety range has been exceeded.

23. The method as recited in claim 1, further comprising:
- assessing vehicle condition data provided by vehicle condition detection means positioned on the vehicle, assessing environment data provided by environment detection means positioned on the vehicle, and determining the safety range as a function of at least one of the vehicle condition data and of the environment data.

24. The method as recited in claim 23, wherein said vehicle condition detection means comprise detection means selected from the group consisting of: steering column detection means; vehicle speed detection means; gear shift detection means; brake detection means; throttle pedal detection means; clutch detection means; and wheel speed detection means.

25. The method as recited in claim 23, wherein said environment detection means comprise detection means selected from the group consisting of: luminosity detection means; road condition detection means; vehicle positioning detection means; proximity detection means; and lane location detection means.

26. The method as recited in claim 15, wherein informing the driver comprises outputting information data through a human-machine interface.

27. The method as recited in claim 16, wherein informing the driver comprises outputting information data through a human-machine interface.

28. The method as recited in claim 21, wherein said step of outputting information data comprises at least one step selected from the group consisting of outputting visual information data on a screen display; outputting visual information data on a head-up display; and outputting spoken information on an voice output.

29. The method as recited in claim 22, wherein said step of outputting information data comprises at least one step selected from the group consisting of outputting visual information data on a screen display; outputting visual information data on a head-up display; and outputting spoken information on an voice output.

30. A method for assessing a traveling vehicle driver's level of inattentiveness caused by excessive distraction due to the driver's performance of secondary tasks and responsively adapting a vehicle motion control subsystem based thereupon, said method comprising:
- taking a series of measurements of a driver's head or eye movement variability and inputting the measurements to a computer processor for analysis;
- analyzing the input measurements using the computer processor and determining therefrom whether an excessive amount of driver attention is being paid to a secondary task based on an assessment of driver distraction;
- detecting a decrease in driving control task performance occurring simultaneously with the excessive driver distraction; and
- preventing engagement of or disengaging the vehicle motion control subsystem based upon said assessment of the driver's excessive level of distraction and the detected simultaneous decrease in driving control task performance, thereby assuring that behavior of the traveling vehicle appropriately matches the driver's present level of attentiveness to driving control tasks.

31. The method as recited in claim 30, further comprising:
- controlling operation of the vehicle motion control subsystem to avoid said vehicle motion control subsystem's establishment of driving conditions that become inherently more dangerous as the driver's level of inattentiveness increases.

32. The method as recited in claim 31, further comprising:
- controlling operation of the vehicle motion control subsystem to prevent said vehicle motion control subsystem's establishment of an inherently more dangerous driving condition when said assessment of the driver's present level of inattentiveness exceeds a predetermined threshold level.

33. The method as recited in claim 30, further comprising:
- disengaging performance of said vehicle motion control subsystem, on an automated basis, after said assessment of the driver's present level of inattentiveness exceeds a predetermined threshold level.

34. The method as recited in claim 33, further comprising:
- providing a driver warning prior to said automated disengagement of said vehicle motion control subsystem.

35. The method as recited in claim 34, further comprising:
- permitting the driver to abort automated disengagement of said vehicle motion control subsystem.

36. The method as recited in claim 30, wherein said vehicle motion control subsystem is a cruise control feature.

37. The method as recited in claim 36, wherein said cruise control feature is of the forward vehicle distance based adaptive type.

38. The method as recited in claim 36, further comprising:
controlling said cruise control feature to reduce set speed when said cruise control is engaged and said assessment of the driver's present level of inattentiveness exceeds a predetermined threshold level.

39. The method as recited in claim 30, wherein said vehicle motion control subsystem is a lane keeping support feature.

40. The method as recited in claim 39, wherein said lane keeping support feature automatically urges, via the vehicle's steering system, the vehicle toward a predetermined relative widthwise position within the travel lane.

41. The method as recited in claim 30, wherein said step of measuring, on a substantially real-time basis, a variable characteristic which correlates to a driver's inattentiveness to vehicle driving tasks further comprises at least one step selected from the group consisting of: measuring a driver's eye movement; measuring a driver's eye-gaze direction; measuring a driver's eye-closure amount; measuring a driver's blinking movement; measuring a driver's head movement; measuring a driver's head position; measuring a driver's head orientation; measuring driver's movable facial features; and measuring a driver's facial temperature image.

42. The method as recited in claim 30, wherein said step of measuring, on a substantially real-time basis, a variable characteristic which correlates to a driver's inattentiveness to vehicle driving tasks further comprises at least one step selected from the group consisting of: measuring driver grip force on a steering wheel; and measuring movement of a steering column.

43. The method as recited in claim 30, wherein said step of assessing the driver's present level of inattentiveness to vehicle driving tasks based at least partially on the measured variable characteristic further comprises one or more steps selected from the group consisting of:
assessing a time weighted parameter characterizing a driver's eye closure over a predetermined period of time;
assessing a time weighted parameter characterizing a driver's off-road eye-gaze over a predetermined period of time;
assessing a time weighted parameter characterizing a driver's blinking movement over a predetermined period of time;
assessing a time weighted parameter characterizing a driver's head position over a predetermined period of time; and
assessing a time weighted parameter characterizing a driver's head movement over a predetermined period of time.

44. The method as recited in claim 30, further comprising informing the driver of an assessment of inattentiveness exceeding the predetermined threshold level on a real-time basis.

45. The method as recited in claim 30, further comprising informing the driver of an assessment of inattentiveness exceeding the predetermined threshold level in the form of post-trip feedback.

46. The method as recited in claim 44, wherein said step of informing the driver further comprises a step of providing a histogram representative of a given period of time.

47. The method as recited in claim 45, wherein said step of informing the driver further comprises a step of providing a histogram representative of a given period of time.

48. The method as recited in claim 44, wherein said step of informing the driver further comprises providing a scaled comparison between a presently measured level of inattentiveness and at least one normative value thereof.

49. The method as recited in claim 45, wherein said step of informing the driver further comprises providing a scaled comparison between a presently measured level of inattentiveness and at least one normative value thereof.

50. The method as recited in claim 30, further comprising providing the driver with a feedback message on how the driver's attitude should be changed to become less inattentive.

51. The method as recited in 30, further comprising determining that the driver's level of inattentiveness is outside a safety range, and informing the driver that the safety range has been exceeded.

52. The method as recited in claim 30, further comprising:
assessing vehicle condition data provided by vehicle condition detection means positioned on the vehicle, assessing environment data provided by environment detection means positioned on the vehicle, and determining the safety range as a function of at least one of the vehicle condition data and of the environment data.

53. The method as recited in claim 52, wherein said vehicle condition detection means comprise detection means selected from the group consisting of: steering column detection means; vehicle speed detection means; gear shift detection means; brake detection means; throttle pedal detection means; clutch detection means; and wheel speed detection means.

54. The method as recited in claim 52, wherein said environment detection means comprise detection means selected from the group consisting of: luminosity detection means; road condition detection means; vehicle positioning detection means; proximity detection means; and lane location detection means.

55. The method as recited in claim 44, wherein informing the driver comprises outputting information data through a human-machine interface.

56. The method as recited in claim 45, wherein informing the driver comprises outputting information data through a human-machine interface.

57. The method as recited in claim 50, wherein said step of outputting information data comprises at least one step selected from the group consisting of outputting visual information data on a screen display; outputting visual information data on a head-up display; and outputting spoken information on an voice output.

58. The method as recited in claim 51, wherein said step of outputting information data comprises at least one step selected from the group consisting of outputting visual information data on a screen display; outputting visual information data on a head-up display; and outputting spoken information on an voice output.

* * * * *